Dec. 6, 1938.    J. E. PADGETT    2,138,980
AUTOMATIC POWER TRANSMITTING MECHANISM
Original Filed July 17, 1933

Inventor
Joseph E. Padgett
By Strauch & Hoffman
Attorneys

Patented Dec. 6, 1938

2,138,980

UNITED STATES PATENT OFFICE 2,138,980

AUTOMATIC POWER TRANSMITTING MECHANISM

Joseph E. Padgett, Toledo, Ohio

Original application July 17, 1933, Serial No. 680,857. Divided and this application November 20, 1935, Serial No. 50,794

7 Claims. (Cl. 192—105)

The present invention relates to automatic power transmitting mechanisms and it is more particularly concerned with centrifugally operating clutches.

This invention aims to provide a centrifugal clutch having means for yieldingly restraining the centrifugal elements against operation in response to centrifugal force to thereby delay the engaging action of the clutch, and although clutches of this general character have been heretofore proposed, they have not proved altogether satisfactory, and my invention aims to provide a clutch which is so designed as to overcome all of the defects of such prior clutches.

This application is a division of my copending application Serial No. 680,857, filed July 17, 1933, (which has now matured into Patent No. 2,045,611 dated June 30, 1936) and in that application I have shown the clutch of this invention in combination with an automatic transmission. The clutch of this invention, while particularly valuable in an automatic transmission, is not limited to such use, and for this reason, and also in order to simplify the disclosure of this application, the driving parts of the clutch will be described as coupled to an engine or other prime mover and the driven parts as connected to a driven shaft or other load. Accordingly, no reference will be made to the automatic transmission of my copending application.

It is a primary object of this invention to provide automatic clutch mechanisms of the character wherein frictional members are adapted to be brought into engagement under the influence of mechanism that is responsive to the speed of one of the members; with novel means for delaying the action of the speed responsive mechanism whereby engagement of the frictional members under the influence of the speed responsive mechanism is confined to the upper part of the operating speed range of the frictional members, and pressure is built up comparatively rapidly between them when the members are accelerated through their upper speed range.

Another object of my invention is to provide automatic clutch mechanisms of the type wherein a speed responsive mechanism is utilized to bring disc-like frictional members into engagement; with a novel mechanism for modifying the action of the speed responsive mechanism so as to produce a predetermined rate of pressure buildup between the frictional members when one of the latter is accelerated through a certain speed range.

Another object of my invention resides in the provision of automatic clutch mechanisms of the type wherein a speed responsive mechanism is adapted to bring frictional members into engagement; with novel means for simultaneously retarding the action of the speed responsive mechanism so that the pressure builds up between the frictional members at a rate that is different from the rate of acceleration of the latter.

Further objects of the invention will appear in the following description when considered in connection with the accompanying drawing, and from the appended claims.

Figure 1:
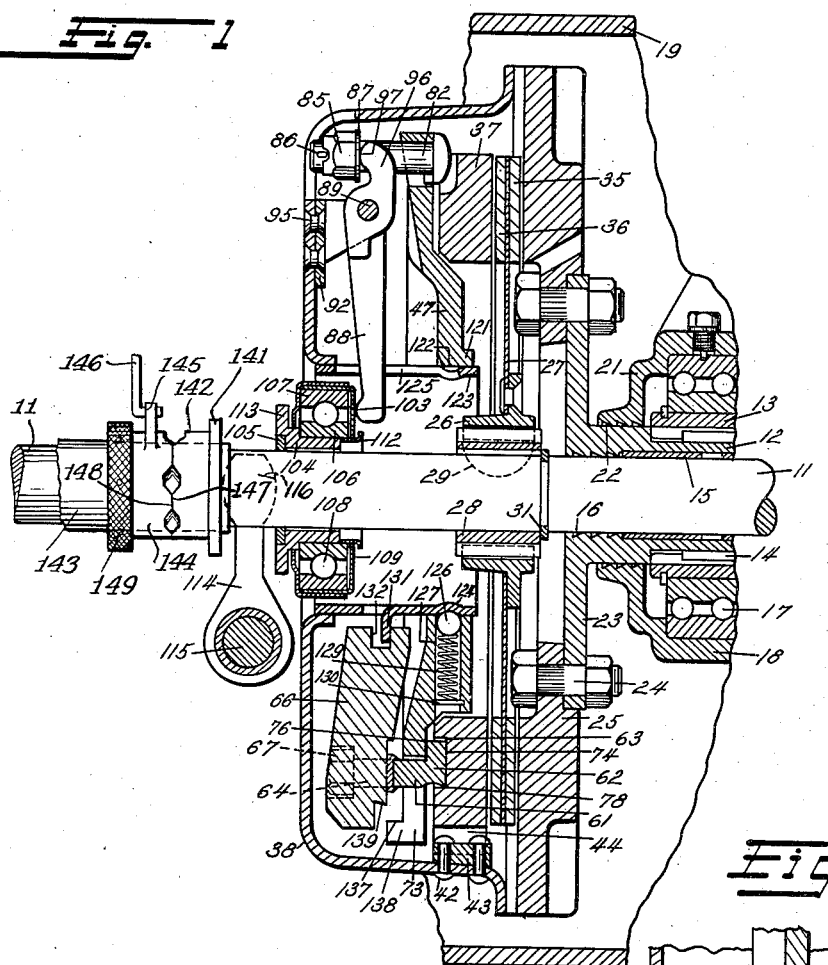
Figure 1 is a longitudinal sectional view of a preferred embodiment of the invention.

With continued reference to the drawing in which like reference characters are employed to indicate like parts throughout the several views, 11 indicates a driven shaft about one portion of which is concentrically disposed a driving shaft 12 which receives torque from a sleeve 13 by means of splines 14. Bushings 15 are provided for supporting driving shaft 12 for rotation relative to the driven shaft, and oil returning grooves 16 are provided on the driving shaft for returning to bushings 15 any lubricant which tends to leak thereby. Sleeve 13 is journalled by means of a bearing assembly 17 within a supporting member 18 which is secured in any suitable manner (not shown) to the clutch housing 19. Supporting member 18 is provided with a radially extending flange portion 21 which contacts driving shaft 12 and which is provided with oil returning grooves 22 for returning to bearings 17 any lubricant tending to leak thereby.

The forward end of driving shaft 12 is provided with a radially extending flange 23, to which is secured by means of bolts 24, a flywheel 25.

A hub 26, carrying a disc 27, is splined to a sleeve 28, and the latter is rigidly secured against rotation on shaft 11 by means of a key 29, and against axial displacement by means of a split ring 31, sprung into a groove in shaft 11.

While I have disclosed disc 27 as being rigidly secured to hub 26, it is to be understood that if it is desired, a suitable resilient coupling, of any well known construction, may be interposed between these two members.

Disc 27 near its periphery is provided with facings 35 and 36 respectively which may consist of any material that has the required characteristics to give the correct frictional gripping force, and at the same time has wearing qualities adapting it for this purpose. I prefer, however, to use the types of material which in practice have given very satisfactory results in an automatic slipping drive and clutch mechanism of the "Powerflo" type. Frictional facings 35 and 36 may be secured to disc 27 in any suitable manner, as for instance by rivets or the like.

Facing 35 secured to disc 27 cooperates with the flat face of flywheel 25 and is adapted to be engaged and frictionally driven thereby. Facing 36 provided on disc 27 cooperates with a plate 37, which will be hereinafter termed the automatic plate for the reason that it is automatically actuated and is adapted to engage and clamp driven member 27 between it and the flat face of the flywheel. Disc 27, along with hub 26 and facings 35 and 36, constitute the driven member, and this entire driven assembly will be hereinafter termed driven member 27 for sake of brevity. Plate 37 is of substantial thickness so that it may possess a sufficient degree of rigidity to prevent undesirable distortion and warpage thereof during operating conditions.

Figure 2:
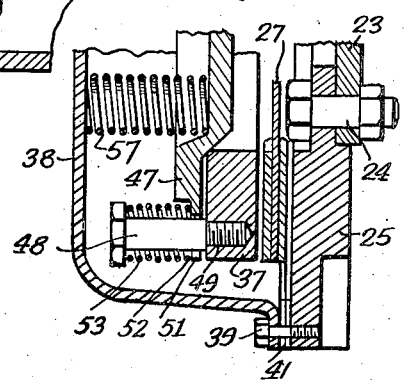
Figure 2 is a fragmental view in section illustrating the holdback bolt assembly forming a part of the invention.

As seen in Figure 2, a cover member 38 is secured to the flywheel by means of cap screws 39. Before cover 38 is secured to the flywheel, however, spacer members 41 are preferably inserted between their cooperating surfaces to space the cover from the flywheel for a purpose that will presently appear. Secured to the inner walls of cover 38 by means of rivets 42 or the like, are preferably three symmetrically arranged driving lug or key members 43. Key members 43 are received in, and cooperate with the walls of recesses 44 formed in automatic plate 37 to establish a driving connection between flywheel 25 and the automatic plate.

Disposed parallel to plate 37 is a plate 47, and it will be hereinafter referred to as a reaction plate because it takes the reaction of the speed-responsive mechanism in a manner to be presently described. Reaction plate 47 is driven by automatic plate 37 through the medium of a plurality of cap screws 48. Referring particularly to Figure 2, each cap screw 48 is provided with a reduced end 49 which is threaded into automatic plate 37, and the thread employed is preferably of the "Dardelet" or other self locking type so as to prevent the cap screws from working loose in operation. Cap screws 48 extend through, and lie in slidable driving engagement with the walls of recesses 51 formed in reaction plate 47, and are encircled by washers 52 and compression springs 53. Springs 53 act against the heads of screws 48 and react against plate 47 to thereby urge the automatic and reaction plates toward each other at all times, and they will be hereinafter referred to as hold-back springs.

The hold-back spring assemblies are preferably symmetrically disposed in pairs about the periphery of the plates, and in the present instance six are employed, but it is to be understood that more or less than six properly designed hold-back spring assemblies may be used if desired without in any way departing from the spirit of my invention. The hold-back assemblies accordingly establish a driving connection between the automatic and reaction plates, and at the same time resiliently urge them toward each other.

Reaction plate 47 is constantly urged toward the flywheel by a plurality of compression springs 57 which act against the reaction plate and react against the inner surface of cover 38.

The automatic and reaction plates may be actuated away from each other by any suitable speed-responsive mechanism, to produce clutch engagement, but in the present embodiment of my invention it preferably takes the form of centrifugally operable mechanism. Preferably three weight levers 61 having integrally formed heads 62 are symmetrically arranged between the pairs of pressure springs 57 and have their heads 62 received in rectangular recesses 63 formed in automatic plate 37. Levers 61 are provided with threaded studs 64 upon which are mounted weight elements 66 which are secured in place by means of nuts 67 threaded on the ends of studs 64.

Levers 61 are of substantial width and extend through recesses 73 formed in reaction plate 47. Heads 62 are provided with flat faces 74 that normally abut the bottoms of recesses 63 when the driving shaft is operating at or below idling speed and are also provided with reaction faces 76 which abut the face of reaction plate 47 at all times, and are designed for fulcruming engagement therewith during operation of the weights.

Heads 62 have their outer sides relieved to provide knife-like edges 78 which are adapted to rock or pivot in the dihedral angles defined by the bottom and outer faces of recesses 63 formed in automatic plate 37.

When shaft 12 is stationary, or is operating at or below a speed corresponding substantially to the idling speed of the prime mover employed to drive it, the parts assume the positions in which they are shown in Figure 1. Heads 62 of levers 61 are clamped between plates 37 and 47, under the influence of springs 53 acting against plate 47 and cap screws 48.

Mounted in plate 47 and preferably symmetrically disposed between the weight assemblies are a plurality of bolts 82. Castle nuts 85 are threaded on bolts 82 and are adapted to be held in adjusted positions thereon by means of cotter pins 86. Hardened washers 87 are disposed on bolts 82 and cooperate with three clutch fingers 88 to produce movement of plate 47 away from the flywheel. Fingers 88 are pivoted on pins 89 secured in brackets 92 which are mounted against parallel portions of cover 38 by means of rivets 95 or the like. Fingers 88 are provided with bifurcated portions 96, and the latter have curved faces 97 that cooperate with washers 87 in a manner to be presently described.

Movement of the inner ends of fingers 88 to the right in Figure 1, through the intermediary of bolts 82, causes movement of plate 47 away from the flywheel against the action springs 57. Movement of the reaction plate produces similar movement of plate 37 because the hold-back assemblies hold the two plates in unitary relationship at all times. Fingers 88 are adapted to be actuated in this manner by means of a throwout assembly that will now be described.

Cooperating with curved faces 103 formed on levers 88 is a throwout assembly consisting of a sleeve member 104 which is mounted for axial movement on shaft 11 by means of a self-lubricating washer 105. Secured to sleeve 104 in any desired manner is a ball race 106. Disposed between ball race 106 and an outer ball race 107 are a plurality of anti-friction balls 108 and the bearing is designed to take a thrust load that is one hundred percent of the radial load. Secured to the outside of race 107 are hardened stampings 109 which define a grease chamber.

A stamping 112 is provided to operate as a dirt "slinger" to keep the dirt from working into the grease reservoir between stamping 109 and race 106.

Although I prefer to use a bearing assembly of the character just described, it is to be understood that any other suitable construction may be used without departing from the spirit of the present invention.

Adapted to cooperate with a flange 113 formed on sleeve 104 is a throwout fork 114, which is secured to a shaft 115 journalled in housing 19. Fork 114 is provided with curved faces 116 which are adapted to contact flange 113. Shaft 115 extends outwardly of housing 19 and is adapted to be actuated by a clutch pedal or lever (not shown).

Reaction plate 47 is provided with a flanged inner periphery 121 which defines a bearing 122. Slidably mounted for axial movement in bearing 122 and the flange in cover 38, is a preferably cylindrical sheet metal sleeve member 123 which is provided with a preferably annular corrugation 124. Levers 88 extend through slots 125 formed in sleeve 123 and serve to prevent the latter from being angularly displaced with respect to cover 38 and reaction plate 47 during operation of the mechanism. Cooperating with corrugation 124 are balls 126 which are preferably three in number and are slidably mounted in recesses 127 located in plate 47. Balls 126 are urged toward sleeve 123 by compression springs 129 which react against pins 130 secured in plate 47.

Sleeve 123 is further provided with tongues 131 which seat in recesses 132 formed in weights 66 and which serve to yieldingly resist operation of the latter in a manner that will hereinafter be described.

Springs 57 constantly urge plates 37 and 47 toward engaging position and in order to maintain the clutch disengaged when the driving shaft is stationary or is operating below the predetermined engaging speed a latch mechanism of any desired form may be used to hold the throwout mechanism in automatic position, but in Figure 1, I have shown the latch mechanism disclosed in Patent No. 1,822,716 to H. H. Vail, dated September 8, 1931 as being associated with the clutch of this invention.

Cooperating with fork 114 is the flange 141 of sleeve 142, which is mounted for axial sliding movement upon a supporting sleeve 143. Sleeve 142 is keyed against rotative movement on member 143 by any suitable means (not shown) and member 143 is stationarily supported in any desired manner.

Mounted for rocking movement on member 143 is a sleeve-like backing member 144 which is provided with a lug 145 and an actuating link 146.

Members 142 and 144 are respectively provided with mating teeth 147 and 148, which, when disposed in the position shown in Figure 1, hold member 142 in its forward position and the latter, acting through fork 114 and the throwout mechanism holds the clutch parts in automatic position. A ring 149 adjustably threaded on member 143 abuts the rear end of member 144 and prevents it from shifting axially.

Accordingly, when link 146 is actuated to rock member 144 so as to bring its teeth 148 into intermeshing relationship with teeth 147 member 142 may move rearwardly and in turn allow springs 57 to force the clutch plates into driving engagement. The clutch may therefore be engaged when the driving member is operating below the centrifugally engaging speed of the weights or is stationary.

Operation of the clutch takes place in the following manner: As driving sleeves 12 and 13 and flywheel 25 are accelerated, weights 66 tend to swing or rock outwardly about their knife-edges 78 as axes in response to centrifugal force. The weights are yieldingly restrained against this tendency by the hold-back assemblies and by the influence of balls 126 acting upon sleeve 123. When flywheel 25 has been accelerated to a speed predetermined by the mass of weights 66, the strength of springs 53 and 129, which are dictated by the operating characteristics desired in the particular installation involved, weights 66 overcome the restraining action of balls 126 and springs 129 and rock outwardly comparatively rapidly causing sleeve 123 to move to the left. As this occurs, reaction faces 76 of heads 62 fulcrum and slide on the face of plate 47, and knife edges 78, by virtue of their engagement and fulcruming action upon the flat bottom surfaces of recesses 63 in automatic plate 37, force automatic plate 37 away from reaction plate 47 against the action of hold-back springs 53, and into engagement with facing 36 of disk 27, on a three-point support, thus causing disk 27 to move axially and bring the facing 35 thereof into contact with the flywheel face.

After the driven member is frictionally clamped or gripped between automatic plate 37 and flywheel 25 in the manner just described, movement of plate 37 is substantially arrested, and further rocking movement of weights 66 causes faces 76 of heads 62 to force reaction plate 47 away from the flywheel against the action of springs 57 and hold-back springs 53. Movement of plate 47 in this manner causes pressure to build up in springs 57 and a corresponding pressure is built up between the edges 78 of heads 62, and the bottoms of the recesses in automatic plate 37 with the result that pressure is built up between the frictional faces of the driving and driven members and shaft 11 is picked up smoothly and without shock. When the pressure builds up to a predetermined value, the plates are brought into non-slipping engagement. As the speed further increases, the pressure builds up further, and when flywheel 25 attains a predetermined speed, weights 66 rock into contact with arcuate faces 137 provided on rim portions 138 which are formed on reaction plate 47. In order to stop weights 66 in a definite plane that is normal to the mechanism, and thus insure dynamic balance of the mechanism, stop-edges on faces 139 are accurately formed on weights 66 for cooperation with faces 137. When the weights have moved into their outermost positions with their faces 139 in contact with faces 137, further acceleration of flywheel 25 is ineffective to cause a further pressure to be built up between the plates. The plates are thereby held in non-slipping engagement under a predetermined pressure, and a positive friction coupling exists between the driving and driven shafts.

When flywheel 25 is decelerated to a predetermined speed, springs 53 force the reaction and automatic plates towards each other which results in weights 66 rocking inwardly and causing sleeve 123 to move to the right to a position where balls 126 snap into groove 124 formed in sleeve 123.

In view of the resilient nature of the backing means for the reaction member, should certain weights 66 swing farther outwardly than the remaining weights during the engaging operation, the pressure exerted by them is nevertheless uniformly distributed about the area of plate 37 for the reason that reaction plate 47 can tilt or float, and take a slight angular position with respect to automatic plate 37, due to the fact that the sole movement limiting means of the reaction member is constituted by bolts 48, and the latter are designed to provide sufficient play or clearance to permit this tilting action.

When the automatic engaging operation just described is taking place, reaction plate 47 and its associated parts are moved to the left of the positions in which they are shown in Figure 1. Movement of reaction plate 47 to the left causes the inner ends of fingers 88 to tend to move from their cooperating engagement with the face of the bearing assembly, thereby relieving the throwout bearing assembly of substantially all pressure.

When flywheel 25 is decelerated, the automatic disengagement of the clutch occurs in a converse manner to the engaging operation just described and sleeve 123 is moved to the right with balls 126 snapped into groove 124 as previously explained.

Manual disengagement of the clutch may be effected in the following manner: When the plates have been automatically brought into full driving engagement in the manner previously described, shaft 115 may be operated to displace throwout bearing assembly and the inner ends of levers 88 to the right of the positions in which they are shown in Figure 1. Movement of levers 88 in this manner causes them to fulcrum about and react against bolts 82 and withdraw the reaction plate from the flywheel. Withdrawal of the reaction plate produces withdrawal or disengagement of automatic plate 37 from the driven member since plates 37 and 47 are held in unitary relation by the hold-back assemblies. If the engine speed is maintained above the predetermined engaging speed during the manual declutching operation, weights 66 remain in their outermost positions; therefore, the declutching operation does not involve retracting the weights against the action of centrifugal force, which, at high speeds might be sufficiently high to preclude affecting the manual declutching operation, if the latter involved retracting the weights.

Figure 3:
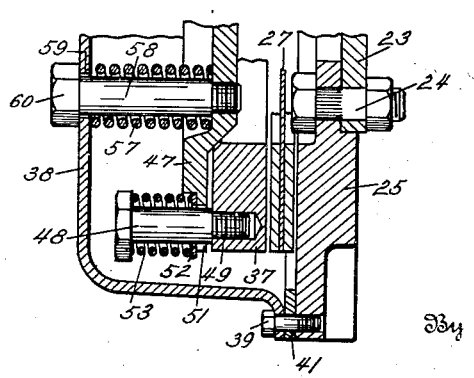
Figure 3 is a view similar to Figure 2 but shows a modified form of the invention.

Referring now to Figure 3, I have shown a modified form of clutch which does not embody a latch mechanism.

Threaded into reaction plate 47 at circumferentially spaced points are a plurality of shouldered bolts 58 whose heads 60 lean against the outer surface of cover 38. Bolts 58 preferably extend through springs 57 so as to maintain them in place and as seen in Figure 3, bolts 58 are of a length sufficient to hold the parts in automatic position when the driving member is operating at idling speed or is stopped.

It is, accordingly, unnecessary to employ a releasable latch mechanism with this form of the invention, which however, does not permit the clutch to be engaged when the driving shaft is operating at idling speed or is stopped. Also, when the clutch centrifugally engages, reaction plate 47 is forced to the left, thereby causing the heads of bolts 58 to move out of contact with cover 38.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a clutch, a driving member, a driven member, centrifugally operable means associated with said driving member for bringing said driving and driven members into engagement when said driving member attains a predetermined speed, a cover member mounted on said driving member and axially spaced therefrom, said driving member and said cover having axially aligned apertures, the walls of said apertures forming bearing surfaces, a sleeve mounted for sliding axial movement in said apertures, and means operably connecting said centrifugally operable means to said sleeve.

2. The clutch described in claim 1, together with means for yieldingly restraining said sleeve against movement out of a predetermined axial position.

3. In a clutch, a driving member, a driven member, a plurality of speed responsive elements for effecting engagement of said members when said driving member attains a predetermined speed, an axially movable sleeve supported by said driving member and having outwardly struck tongues engaging said speed responsive elements to insure synchronous operation thereof, said driving member having at least one bore opening on said sleeve, a ball detent disposed in said bore and having means urging it into contact with said sleeve, said sleeve having a depressed portion designed to receive said detent when said elements are disposed in retracted position, so that said detent is effective to exert retarding forces on movement of said sleeve and delay operation of said speed responsive elements.

4. In a clutch, driving and driven members mounted for engagement and disengagement, a reaction member operatively associated with said members, a plurality of centrifugally operable levers acting against said driving member and reacting against said reaction member, for forcing said driving and driven members into engagement when one of said members attains a predetermined speed, said reaction member being generally annular in form to provide a central aperture, a sleeve mounted for axial sliding movement in said central aperture of said reaction member, means for connecting said levers to said sleeve, for controlling the operation thereof, a plurality of throw-out levers connected to said reaction member and extending through apertures in said sleeve, and a throw-out device mounted for axial sliding movement within said sleeve and cooperating with the inner ends of said throw-out levers.

5. The clutch described in claim 4, wherein said means for connecting said levers to said sleeve comprises a plurality of tongues provided on said sleeve, and seating in recesses provided in said levers.

6. The clutch described in claim 4, wherein the portion of said sleeve which slides in the central aperture of said reaction member is provided with a depression, and means are provided on said reaction member for frictionally cooperating with said depression and yieldingly restraining said sleeve against movement out of a predetermined axial position.

7. In a clutch, driving and driven members mounted for engagement and disengagement; speed responsive means comprising a plurality of centrifugally operable levers acting upon one of said driving members, for forcing said members into engagement when one of said members attains a predetermined speed; retarding means for yieldingly restraining said levers against clutch engaging movement; means cooperating with said one driving member for disengaging said members without disturbing the relationship between said retarding means and said centrifugally operable levers; and means acting upon said one driving member for bringing said driving and driven members into engagement independently of said centrifugally operable levers, and without disturbing the relationship between the latter and said retarding means.

JOSEPH E. PADGETT.